Feb. 9, 1932.  M. PIRANI ET AL  1,844,367
GASEOUS ELECTRIC DISCHARGE DEVICE
Filed Nov. 15, 1929
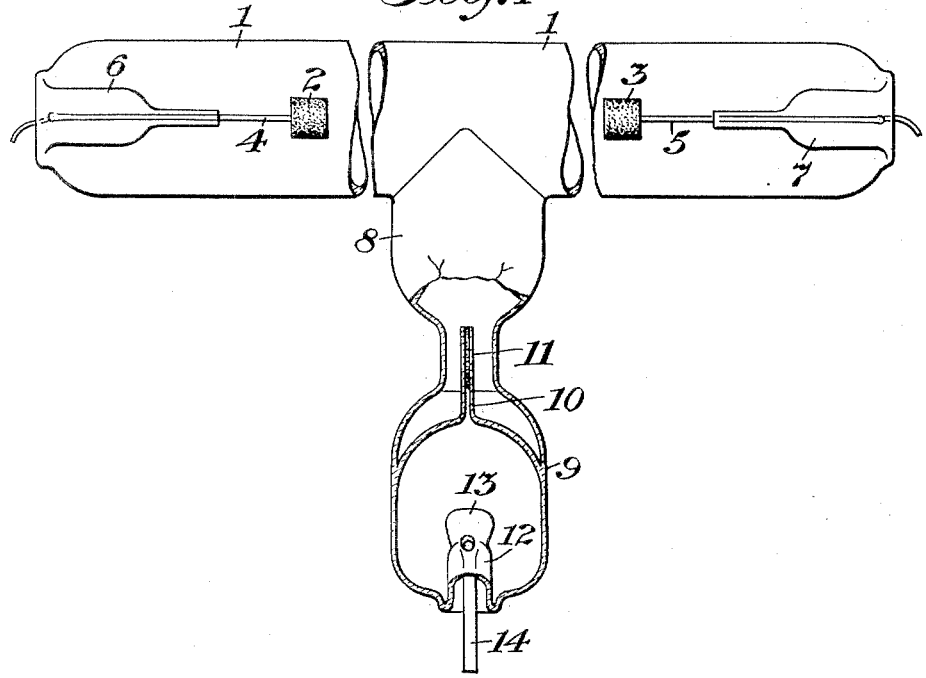
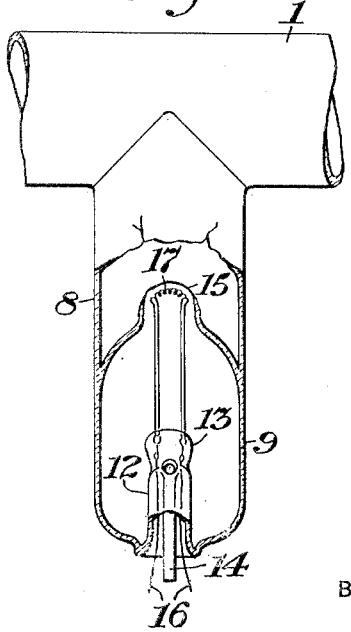
INVENTORS
Marcello Pirani
Martin Reger
BY
Charles A. Tullar
THEIR ATTORNEY Patented Feb. 9, 1932

1,844,367

UNITED STATES PATENT OFFICE

MARCELLO PIRANI, OF BERLIN-WILMERSDORF, AND MARTIN REGER, BERLIN, GERMANY, ASSIGNORS TO GENERAL ELECTRIC COMPANY, A CORPORATION OF NEW YORK

GASEOUS ELECTRIC DISCHARGE DEVICE

Application filed November 15, 1929, Serial No. 407,524, and in Germany January 21, 1929.

The present invention relates to gaseous electric discharge devices generally and the invention relates particularly to apparatus for replenishing the gas content of such devices.

Gaseous electric discharge devices filled with rare gas or gases usually have a long operating life of approximately 1,000 or more hours. In most cases the failure of these devices to continue operating even longer has been due to a clean-up of the gas content. It is the object of this invention to increase the operating life of gaseous electric discharge devices by replenishing the gas content at such time as these devices become inoperative due to the clean-up of the gas content.

The object of the invention is accomplished by fusing an off-set chamber onto any convenient part of the discharge chamber, said off-set chamber being filled with a gas or gases similar to the gas content of the discharge chamber, and at a higher pressure than that in the discharge chamber. The off-set chamber in the direction of the interior of the discharge chamber is hermetically sealed by an easily fusible metal. Such metal seal may be in the form of an easily fusible metal plug set into and hermetically sealing a capillary tube extending toward the interior of the discharge chamber, or it may consist of a thin cap sealed into the glass walls of the off-set chamber on that side toward the interior of the discharge chamber. It will be understood that the seal may be made in many forms other than those described above without departing from the broad spirit and scope of the invention.

In the drawings accompanying and forming part of this specification two embodiments of the invention are shown for purposes of illustration in which Fig. 1 is a side elevational view of a gaseous electric discharge device with one embodiment of the new and novel off-set reserve gas chamber in cross section.

Fig. 2 is a side elevational view of a gaseous electric discharge device with an alternative embodiment of the off-set reserve gas chamber shown in cross section.

Referring to Fig. 1 the gaseous electric discharge device consists of a cylindrical glass chamber 1 with electrodes 2, 3 sealed therein. Said electrodes consist of a sintered body attached to stems 4, 5 fused into base parts 6, 7. A small glass chamber 9 is fused to off-set tube 8 of the chamber 1. Said chamber 9 is provided with capillary tube 10 which is hermetically sealed by plug 11 made of an easily fusible metal alloy and extends in the direction of the interior of the discharge chamber. To the container 9 is fused base tube 12 and exhaust tube 14. After chamber 9 has been exhausted through tube 14 a gas filling is introduced into chamber 9 through said tube 14. Such gas filling is at a greater pressure than that of the gas filling of discharge chamber 1. Atmospheric pressure has been found suitable. When proper conditions are obtained exhaust tube 14 is sealed off. As chamber 9 is hermetically sealed by plug 11 in capillary tube 10 no gas from said chamber 9 can seep over into the discharge chamber 1 during the normal operating life of the device. When the device 1 refuses to function normally that part of the off-set tube 8 which surrounds the capillary tube 10 is heated either by a flame or an electric heating ring. This melts the plug 11 and an unobstructed passage of the reserve gas in chamber 9 over into discharge chamber 1 then takes place. Chamber 9 and the pressure of the gas filling therein is so proportioned with respect to discharge chamber 1 and the pressure of the gas contained therein, that, with the opening of the seal, normal gas pressure is restored to chamber 1.

Referring to Fig. 2, the device consists of a glass discharge chamber 1, off-set tube 8 with reserve chamber 9 fused therein. Said reserve chamber 9 being provided with a thin, easily fusible metal cap 15 on the side toward the interior of the discharge chamber. Current leads 16 are fused into pinch seal 13 of base part 12 of reserve chamber 9. Exhaust tube 14 is led up through base part 12 and opens into chamber 9. Said current leads 16 are in connection with heater element 17 located in chamber 9 in close proximity to cap 15. When the gas content of discharge chamber 1 is no longer sufficient for the continued operation of the device cap 15 is heated by applying current to heater element 17 either by hand or by the methods and devices such as those disclosed in the application of Ewest and Pirani filed July 9, 1929, Serial No. 377,009. The thin sheet of metal forming cap 15 is quickly softened and the pressure of the gas in reserve chamber 9 is sufficient to blow it out. The gas in chamber 9 may then seep over into discharge chamber 1.

If a particularly long operating life is desired several reserve gas chambers may be provided. The shape of the electrodes 2, 3 and the reserve chamber 9 may be varied. A heating filament surrounding capillary tube 10 may be employed to melt metal plug 11. As hereinbefore stated, heating filament 17 may be put in the circuit manually or automatically. In the latter case the effect of the loss of pressure of the gas on the current density of the device serves to put the heating means in circuit.

While we have shown and described and have pointed out in the annexed claims certain new and novel features of the invention, it will be understood that various omissions, and substitutions and changes in the forms and details of the devices illustrated and in the use and operation of same may be made by those skilled in the art without departing from the broad spirit and scope of the invention.

What we claim as new and desire to secure by Letters Patent of the United States, is:—

1. In an electric discharge device, a container, electrodes for said container, a gas filling in said container, a reserve gas chamber joined to said container, an easily fusible dividing body between the gas filled container and the reserve gas supply chamber impervious to said gas, and means for heating said dividing body.

2. In an electric discharge device, a container, electrodes for said container, a gas filling in said container, a reserve gas chamber joined to said container, an easily fusible dividing body between the gas filled container and the reserve gas supply chamber impervious to said gas, said reserve gas chamber containing gas at a higher pressure than that in the container, and means for heating said dividing body.

3. In an electric discharge device, a container, electrodes for said container, a gas filling in said container, a reserve gas chamber joined to said container, an easily fusible dividing body between the gas filled container and the reserve gas supply chamber impervious to said gas, said reserve gas chamber being so proportioned and containing gas at such pressure with respect to the container and the pressure of the gas therein that normal conditions of gas pressure are restored to the container on the melting of said easily fusible dividing body, and means for heating said dividing body.

In witness whereof, we have hereunto set our hands this 30th day of October, 1929.

MARCELLO PIRANI.
MARTIN REGER.